US006150444A

United States Patent [19]

Brodeur, Jr. et al.

[11] Patent Number: 6,150,444
[45] Date of Patent: *Nov. 21, 2000

[54] FLOOR COVERINGS

[75] Inventors: Ed A. Brodeur, Jr., Marietta, Ga.; Lou Ann Napolitano, Sandusky, Ohio

[73] Assignee: Ludlow Composites Corporation, Fremont, Ohio

[*] Notice: This patent is subject to a terminal disclaimer.

[21] Appl. No.: 09/353,489

[22] Filed: Jul. 13, 1999

Related U.S. Application Data

[63] Continuation of application No. 08/946,186, Oct. 7, 1997, Pat. No. 5,965,650.

[51] Int. Cl.$^7$ ........................................................ C08K 5/07
[52] U.S. Cl. ............................................. 524/357; 524/834
[58] Field of Search ...................................... 524/357, 834

[56] References Cited

U.S. PATENT DOCUMENTS

| | | |
|---|---|---|
| Re. 34,951 | 5/1995 | Slosberg et al. . |
| 3,238,595 | 3/1966 | Schwartz et al. . |
| 3,309,259 | 3/1967 | Schwartz et al . |
| 3,328,225 | 6/1967 | Urbanic et al. . |
| 3,347,735 | 10/1967 | Dildilian . |
| 3,402,094 | 9/1968 | Levitch . |
| 3,441,464 | 4/1969 | Blue . |
| 3,518,102 | 6/1970 | Mertgen et al. . |
| 3,695,987 | 10/1972 | Wisotzky et al. . |
| 3,728,182 | 4/1973 | Wisotzky et al. . |
| 3,867,243 | 2/1975 | Stoller . |
| 3,902,452 | 9/1975 | Queen et al. . |
| 3,953,269 | 4/1976 | Queen et al. . |
| 4,017,649 | 4/1977 | Brumlik . |
| 4,081,579 | 3/1978 | Queen et al. . |
| 4,582,554 | 4/1986 | Bell et al. . |
| 4,702,950 | 10/1987 | Slosberg et al. . |
| 5,407,617 | 4/1995 | Uppermann et al. . |
| 5,416,146 | 5/1995 | Kushida et al. . |
| 5,547,741 | 8/1996 | Wilson . |
| 5,965,650 | 10/1999 | Brodeur, Jr. et al. .................. 524/357 |

*Primary Examiner*—John M. Cooney, Jr.
*Attorney, Agent, or Firm*—Emch, Schaffer, Schaub & Porcello Co., L.P.A.

[57] ABSTRACT

These compositions encompass products made of flexible plasticized PVC, usually formulated as a dispersion of high molecular weight PVC resins in a special blend of plasticizers. Both PVC resins and plasticizers are chosen from a vast selection of each to best conform to the needs of the end use. Huge macro molecules of highly ordered PVC pack and interlock to form a rigid polymer. Properly chosen plasticizers lead to flexible floor coverings useful in anti-fatigue mats and launderable, walk off mats.

16 Claims, 1 Drawing Sheet

FLOOR COVERINGS

This application is a continuation of application Ser. No. 08/946,186 filed on Oct. 7, 1997, now U.S. Pat. No. 5,965,650.

TECHNICAL FIELD

This invention relates to floor coverings and cast films of resilient solid and foamed polyvinyl chloride (PVC) films.

BACKGROUND ART

Flexible vinyl chloride (PVC) cast solid and foamed films in varying thicknesses are used for many applications; particularly in the floor covering field. Most notably, these are found in the walk off mat industry, the fatigue mat industry, and the carpet backing industry. Being a true thermoplastic material PVC is characterized by memory and slow recovery to deformation as opposed to true crosslinked polymers like natural rubber and certain polyurethanes. The processing ease, chemical and environmental tolerances, versatility of properties and relative favorable economics make PVC a material of choice wherever possible.

Walk Off Mats

Walk off mats are carpet type products found in doorway entrances for the purpose of removing soiling type material from shoe soles. Many of these are laundered periodically and reused. The mat is a tufted carpet module of varying size cast into either a vinyl backing material or imbedded into a layer of varying types of rubber backings. After subjecting the mat to a suitable amount of heat necessary to cure the backing; the product is trimmed leaving a border of rubber or PVC on all sides of the final mat. Heretofore rubber backed mats have withstood the heat and tumbling action of laundering processes better than conventional PVC backed mats. Conventional PVC mats soften with heat and are easily stretched distorting the borders. The borders are stretched beyond their ability to recover and end up "rippled". In all other respects, conventional PVC mats are superior to the commercial rubber mats product at this time.

Anti-Fatigue Mats

Anti-fatigue mats are foamed polymer pads generally varying in thicknesses from ¼" to ¾". The purpose of these mats is to bio-mechanically absorb as much of the stress to anatomical body joints and limbs and return energy efficiently as possible to these body parts reducing the contribution that the human body has to make to lift the foot off the floor. Since impact force is greater and the impact time is shorter, an elastic mat that recovers deformation quickly will provide far greater lifting power than a dead, slow recovery non-resilient mat. Generally, rubber foam is elastic; more resilient than conventional PVC foam. In addition, the mat or pad substantially instantly recovers deformation resulting in the mat being ready to reabsorb additional impact energy.

DISCLOSURE OF THE INVENTION

The compositions of this invention encompass products made of flexible plasticized PVC, usually formulated as a dispersion of high molecular weight PVC resin in a special blend of plasticizers. Both PVC resins and plasticizers are chosen from a vast selection of each to best conform to the needs of the end use. Huge macro molecules of highly ordered PVC pack and interlock to form a rigid polymer. Properly chosen plasticizers will form a stable orientation by virtue of the complex geometry of both the PVC and the plasticizer.

This invention makes PVC comparative to natural rubber in resilience and elasticity while even improving the superiority of PVC in many accepted areas of mechanical and chemical properties. While the literature describes small differences in resiliency by the use of certain plasticizers, this invention goes far beyond any known published or divulged information in altering PVC to approach natural rubber in elasticity. Normal plasticizers used for PVC are generally of the following construction

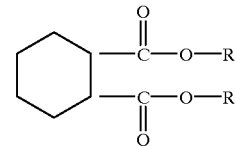

"R" in this case is generally a linear or branched alkyl group of 6 to 11 carbon atoms.

PVC resins of this invention are homopolymers having huge macro molecules of repeated units of vinyl chloride

wherein n is an integer ranging from about 1000 to about 2500. The PVC resins of this invention have a K value of at least 75 and preferably ranges from 75 to 100. Molecular weight as used throughout this specification means weight average molecular weight. "K value" is a universal measure of molecular weight. K values above 75 are considered high; K values below 65 are considered low.

BEST MODE OF CARRYING OUT INVENTION

Figure 1:
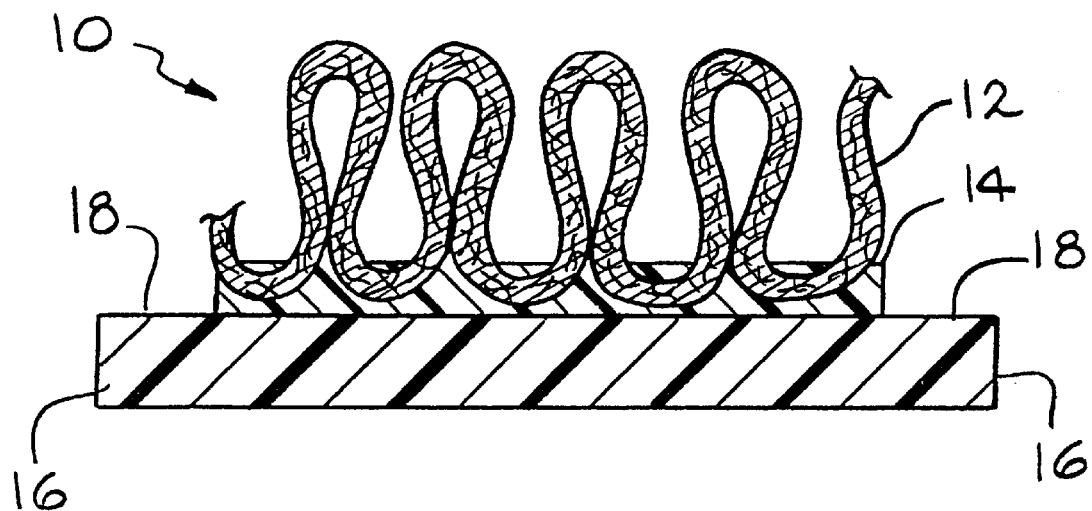
FIG. 1 is a cross-sectional view of the walk off mat of the invention.

FIG. 1 shows walk off mat 10 comprising tufted fibrous yarn or carpet 12 and tufting backing layer 14 are imbedded into the flexible PVC film of this invention shown as substrate 16. Substrate 16 is larger than carpet 12 and backing 14 and forms border 18 around them.

The fibrous material and yarns employed as yarn or carpet 12 may comprise synthetic, natural or a combination of synthetic and natural fibers, such as but not limited to, polyamides like nylon, olefins like polypropylene, wool and wool blends, acrylic, acrylic-nylon blends and polyester yarns and combinations and blends thereof.

Carpet 12 requires a backing layer 14 into which the tufts of yarn are imbedded. In the case of a tufted-type carpet, this is commonly a scrim or woven type material comprised of glass fibers, polyester fibers, polypropylene, jute, nylons, acrylics or combinations of fibers. Carpet 12 can also be imbedded into a resinous layer of a variety of polymers such as, but not limited to, PVC, polypropylene, and bituminous layers. Layer 16 is generally a heavy layer of PVC or natural or synthetic rubber that holds the mat down and protects the mat from the floor and protects the floor from soiling from above. In the case of PVC backed mats, the formulation is basically composed of a phthalate plasticizer such as DOP, a PVC resin of unspecified molecular weight and as much inert inexpensive fillers, generally, and not limited to, calcium carbonate as the application will tolerate.

Figure 2:
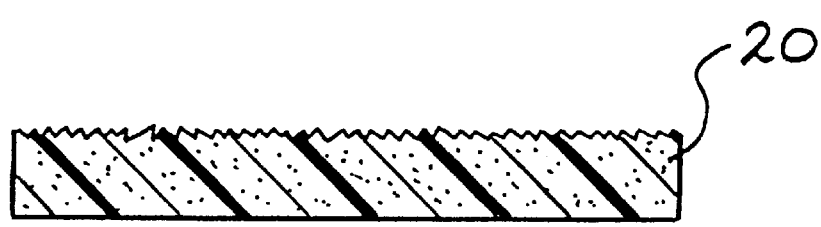
FIG. 2 is a cross-sectional view of anti-fatigue mat of the invention.

FIG. 2 shows the anti-fatigue mat of this invention as substrate 20.

According to the invention, we have found that by replacing all or part of the plasticizer by a less aromatic molecule, such as an adipate structure, we enhance the resiliency of the PVC. We have found that by coupling these with a high molecular weight PVC, we further enhance resiliency. We have found that by treating such a system for a length of time at temperatures between 130 and 160° F., we further enhance resiliency. The adipate structures are dibasic aliphatic acids plasticizer construction having the formula:

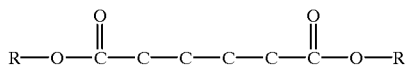

The "R" in this case is a linear or branched alkyl group having 6 to 11 carbon atoms. The structure of this molecule permits closer proximity of the polar sites of the plasticizer to the polar sites of the corresponding PVC resin. Examples of esters of dibasic aliphatic acids include dioctyl adipate, diisodecyl adipate, dioctyl azelate and dioctyl sebacate. Annealing stabilizes this orientation.

Examples of phthalic diesters include esters of phthalic acid with one or two $C_4$ to $C_{12}$ alcohols, for example dioctyl phthalate, diisooctyl phthalate, diisononyl phthalate, diisodecyl phthalate, diisoundecyl phthalate, butyl benzyl phthalate and octyl benzyl phthalate.

The molecular weight of the plasticizers range from 300 to 500 in most cases. Molecular weight as used herein means weight average molecular weight.

We have found that by varying the ratio of aliphatic to aromatic plasticizers and by using high molecular weight PVC, we can move away from normal PVC resiliency towards and all the way to natural rubber resiliency. We have found that for foam constructions in the 20 to 30 pounds per cubic foot, a range of resiliency from 10 to 45 on the ASTM D2632 resiliometer is achieved. Vertical rebound for foamed natural rubber will measure between 40 to 45 on the instrument scale. Conventional PVC with the following general foam formulation will generally measure in the range of 6 to 10.

| | |
|---|---|
| PVC (K values 65 to 70) Homopolymer | 100 parts |
| Dioctyl Phthalate (DOP) | 60–100 parts |
| AZO Dicarbonamide Blowing Agent | 3 parts |

We replace 50 to 100% of the DOP plasticizer with DOA (adipate) plasticizer, resiliency will increase from 10 to 30 on the scale if we increase the molecular weight of the PVC resin from the mid-60's to 80 (K value). Resiliencies over 35 are easily obtained. If we anneal the system, resiliencies of 40 or better will result. So-called anti-fatigue mats produced at this time are samples of products that are greatly improved by this invention. Our invention produces a PVC foam equal in resiliency to rubber as measured by the ASTM D2632 resilience by vertical rebound test.

The PVC foams of this invention can be manufactured by blending a powder and liquid mixture comprising the thermoplastic polymer, plasticizer fillers, blowing agents or frothing agents, and additives onto a substrate or conveyor belt. The powder mixture then may be smoothed between smoothing rolls and foamed and fused at a temperature within the range of foam about 120° to about 200° C. The floor coverings can be manufactured at a width of about 2 to about 5 meters using commercially available processing equipment.

EXAMPLE I

Anti-Fatigue Mats

A formula for an anti-fatigue mat is as follows:

| | |
|---|---|
| Oxy 80 HC - High Molecular Wt. - PVC | 30–100 parts |
| Medium Molecular Weight Homopolymer or | |
| - Copolymer PVC | 0–30 parts |
| DOP/Di Octyl Adipate (DOA) - Plasticizer Blend | 100 parts |
| AZO Di-carbonamide - Blowing Agent | 3 parts |
| 15% Zinc Octoate - Blow Promoter | 2 parts |
| Calcium Carbonate - Filler | 25 parts |

This invention recognizes that by replacing all or part of the plasticizer with an adipate based plasticizer and replacing all or part of the resin with a high molecular weight resin with a K value of over 75, we move from regular PVC properties toward the resiliency of rubber.

This invention also includes the enhancement of the resiliency by post-annealing the cast and cured product.

The above formula will produce a PVC foam with a density of 30 pounds per cubic foot. After 30 minutes—150° F. annealing, this foam will measure (ASTM D2632) from about three to about five times the vertical rebound resiliency to normal fatigue mats common to the industry. This foam will surpass latex natural rubber foam and is equivalent to milled rubber foam.

While the numbers given apply to a typical fatigue mat found in the field, similar movement up and down the scale for elasticity and resiliency also apply to films of varying thickness covering density ranges from 80 to 8 pounds per cubic foot. Such products are also manufactured by mechanically frothing the formulation. Using a silicone surfactant such as Dow Corning's DC.1250 instead of or along with a chemical blowing agent such as, but not limited to, AZO dicarbonamide. Hydrazine based blowing agents are also commonly used.

This invention also permits us to make a superior launderable "walk off" mat, described as follows. Walk off mats are carpet type products found in doorway entrances for the purpose of removing soiling type material from shoe soles prior to entering a building. Many of these are laundered periodically and reused.

According to the invention, the mat includes a tufted carpet module of varying size cast into a syrupy layer of special polyvinyl chloride plastisol (mixture of polyvinyl chloride resin dispersed into a liquid plasticizer). After subjecting the PVC to a suitable amount of heat necessary to fuse the PVC into a thermoplastic flexible layer, the product is trimmed leaving a border of PVC on all sides of the final mat.

The finished product is either heated for 30 minutes in an oven or is allowed to sit for 30 minutes in 150° water before tumbling and cleaning. The PVC resin can contain some lower molecular resins, copolymers or so-called large particle size blending resins, but the preponderance of the PVC resin has to be above 77 in "K" value. Under this invention, the durability of the vinyl is markedly enhanced as the proportion of resins with a K value of over 75 is increased. The plasticizer should be in the range of "70" to "100" parts per hundred parts (PHR of PVC). Filler level should be between "0" and "50" PHR. Annealing is best accomplished between 145 and 155° F. for 20–30 minutes, higher temperatures are not as good and lower temperatures do not work. The thickness of the vinyl is preferably in the 70–80 mill range with densities between 50–90 pounds per cubic foot. It may be possible to include some foaming in certain application. The carpet can be backed by foam or laminated to foam for cushioning or anti-fatigue purposes as well.

EXAMPLE II

Walk Off Mat

A formula for a launderable/annealable mat is as follows.

| | |
| --- | --- |
| Oxy 80 HC - High Molecular Wt. PVC (K Value 80) | 100 parts |
| DOP/DOA Blend | 80–100 parts |
| Filler | |
| Calcium Carbonate | 0–50 parts |
| Color | As Needed. |

Carpet—nylon tufted in non-woven polyester backing. Any fiber that will withstand 375° F. can be used in the face and backing. Process at 375° by laying down a 70 mil. (0.070") layer of PVC upon which the carpet is laid and fusing both together in a belted oven.

EXAMPLE III

Prior Art Walk Off Mat

A normal PVC backed mat varies in formulation depending upon the face fibers used, as well as the primary backing material into which the yarn is tufted. If either of these contain olefin fibers, then a typical formulation for PVC would look like this:

| | Parts |
| --- | --- |
| 4% Acetate Dispersion Type Copolymer | 50–100 |
| Oxy 675 Large Particle Size Blending Resin | 0–50 |
| Plasticizer | |
| DOP Di-Octyl - Phthalate | 60–90 |
| Filler | |
| Calcium Carbonate | 50–200 |
| Color | 1–2 |

PVC resins and plasticizers are chosen to produce the optimum balance of economics and properties for a PVC layer fused in the range of 290°–310° F.

EXAMPLE IV

Prior Art Walk Off Mat

Many mats are made with nylon or polyester yarns tufted into polyester backings or polyester/nylon (or other non-olefinic fibers) blends to permit higher oven processing temperatures for better PVC toughness as measured by tensile and tear tests. A formulation for a mat of this type is as follows:

| | Parts |
| --- | --- |
| Homopolymer PVC | |
| Oxy 6337 | 50–100 |
| Homopolymer Blending | |
| Oxy 567 | 0–50 |
| Plasticizer | |
| DOP (Di Octyl - Phthalate) | 60–90 |
| Filler | |
| Calcium Carbonate | 50–200 |
| Color | 1–2 |

Our invention produces a vinyl mat that will have increased resiliency and durability greater than rubber mats in the market today and will withstand the forces involved in commercial laundries that have heretofore "rippled" the edges of the PVC backed mats common to the trade.

While not ignoring other applications, I have used the areas of launderable walk off mats and fatigue mats to illustrate the broad applications of this invention. Many more areas of use are known where the superior overall properties of PVC enhanced by the elastic nature of rubber is of value. A few of these are sport surfaces, aerobic mats, special industrial gasketing, carpet underlays, foamed back commercial carpet, foamed back carpet tiles and foamed back resilient flooring.

We claim:

1. A floor covering composition comprising at least one high molecular weight homopolymer of a polyvinyl chloride resin which has a K value of at least 75 and is represented by the formula

$(-H_2CCHCl-)_n$ wherein n is an integer ranging from 1000 to about 2500;
at least one dibasic aliphatic acid plasticizer; and
between 0 and 50 parts by weight of a filler per 100 parts of the polyvinyl chloride.

2. The composition according to claim 1 wherein the composition has been annealed at a temperature ranging from about 130 to about 160° F. for a time ranging from about 20 to about 30 minutes.

3. The composition according to claim 1 wherein the composition includes at least one phthalic diester plasticizer.

4. A composition according to claim 1 wherein the homopolymer has a K value ranging from 75 to 100.

5. A composition according to claim 1 wherein the homopolymer is made of large macro molecules.

6. A composition according to claim 3 wherein the composition is a blend of PVC homopolymers and PVC copolymers.

7. A composition according to claim 3 wherein the phthalic plasticizer is made from at least one $C_4$ to $C_{12}$ alcohol.

8. A composition according to claim 1 wherein the aliphatic plasticizer is represent by the formula

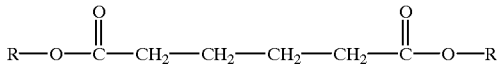

wherein R is a linear or branched alkyl group having 6 to 12 carbon atoms.

9. A composition according to claim 1 wherein the aliphatic plasticizer is an adipate plasticizer.

10. A composition according to claim 3 comprising:

100 parts by weight of PVC resin, and 70 to 100 parts by weight of plasticizer per 100 parts of PVC resin, wherein at least 50 weight percent of the plasticizer is aliphatic plasticizer.

11. A composition according to claim 10 wherein 50 to 80 weight percent of the plasticizer is aliphatic plasticizer.

12. A floor covering layer comprising the composition of claim 1.

13. An anti-fatigue foam pad comprising the foamed composition of claim 1.

14. A floor covering composition consisting essentially of at least one high molecular weight homopolymer of a polyvinyl chloride resin which has a K value of at least 75 and is represented by the formula

wherein n is an integer ranging from 1000 to about 2500;

at least one dibasic aliphatic acid plasticizer; and between 0 and 50 parts by weight of a filler per 100 parts of the polyvinyl chloride.

15. A floor covering composition comprising 100 parts by weight of at least one high molecular weight homopolymer of a polyvinyl chloride resin which has a K value of at least 75 and is represented by the formula

wherein n is an integer ranging from 1000 to about 2500; and 70 to 100 parts by weight of at least one dibasic aliphatic acid plasticizer per 100 parts of polyvinyl chloride resin.

16. A composition according to claim 15 including between 0 and 50 parts by weight of a filler per 100 parts of the polyvinyl chloride.

* * * * *